(No Model.)
M. THOMSEN.
BICYCLE LOCK.
No. 583,638.            Patented June 1, 1897.
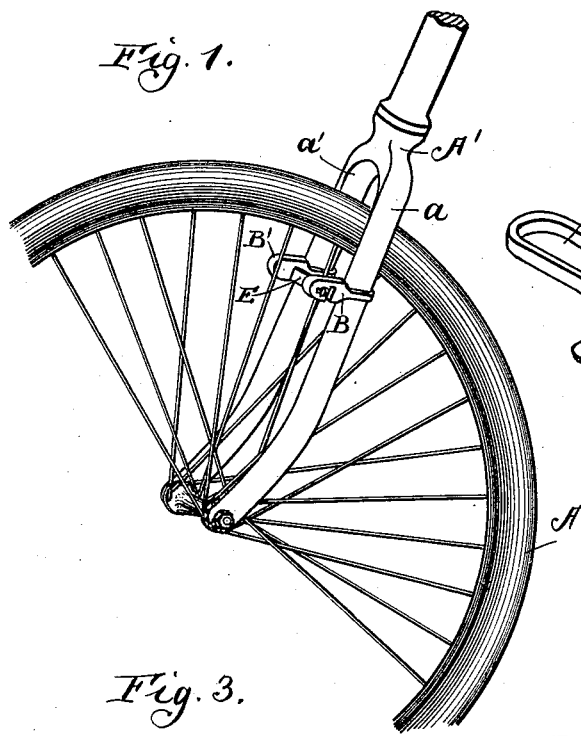
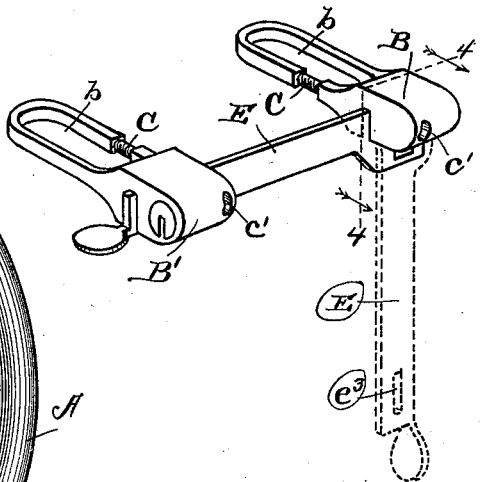
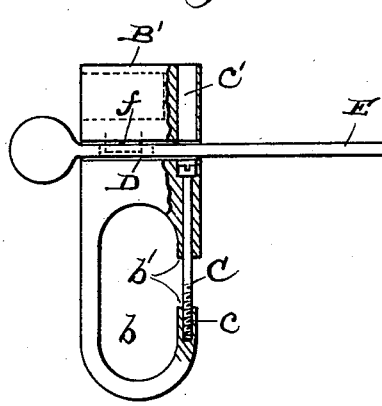
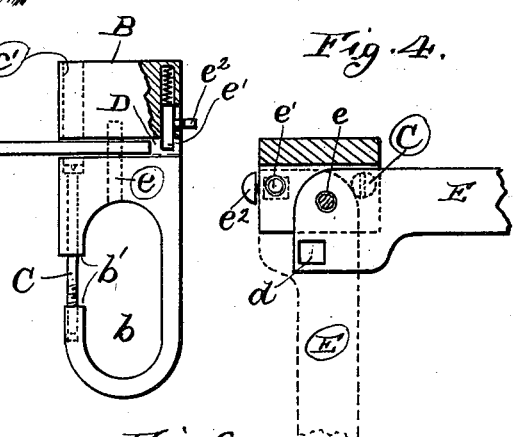
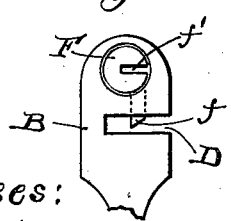
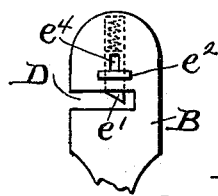
Witnesses:
R. J. Jacker.
E. A. Duggan.
Inventor:
Max Thomsen
By Chas. E. Tillman
Atty.
THE NORRIS PETERS CO., PHOTO-LITHO., WASHINGTON, D. C.

UNITED STATES PATENT OFFICE.

MAX THOMSEN, OF CHICAGO, ILLINOIS, ASSIGNOR, BY MESNE ASSIGNMENTS, TO THE H. C. SCHROEDER COMPANY, OF ILLINOIS.

BICYCLE-LOCK.

SPECIFICATION forming part of Letters Patent No. 583,638, dated June 1, 1897.

Application filed December 24, 1894. Serial No. 532,861. (No model.)

*To all whom it may concern:*

Be it known that I, MAX THOMSEN, a citizen of the United States, residing at Chicago, in the county of Cook and State of Illinois, have invented certain new and useful Improvements in Locks for Bicycles, of which the following is a specification.

This invention relates to improvements in locks to be used on bicycles; and it consists in certain peculiarities of the construction, novel arrangement, and operation of the various parts thereof, as will be hereinafter more fully set forth and specifically claimed.

The objects of my invention are, first, to provide a lock for bicycles which shall be simple and inexpensive in construction, strong and durable, and effective in operation, and, second, such a lock which may be so secured to the frame of the bicycle that it will ever be in readiness to lock or scotch the wheel, and thus prevent the machine being ridden or trundled away.

In order to enable others skilled in the art to which my invention pertains to make and use the same, I will now proceed to describe it, referring to the accompanying drawings, in which—

Figure 1 is a perspective view of a portion of the front wheel and front fork of the bicycle with my lock attached, showing the wheel secured or scotched. Fig. 2 is a perspective view of the lock detached from the front fork, showing it in its locked position by continuous lines and the unlocked position of the cross-bar by broken lines. Fig. 3 is a bottom plan view, partly in section, of the lock, showing the parts in the position they will assume when the wheel is locked. Fig. 4 is a sectional view taken on line 4 4 of Fig. 2. Fig. 5 is an external side view of a portion of one of the clamps or clasps for the fork, and Fig. 6 is a similar view of a portion of the other clamp or clasp.

Similar letters refer to like parts throughout the different views of the drawings.

A represents the front wheel of a bicycle, which may be made of the ordinary or any preferred construction, and has, as usual, the front fork A', which strides the wheel and is connected at the free ends of its prongs to the axle. On the prongs $a$ and $a'$ of the fork A' is located, respectively, the clasps or clamps B B', which are made of any suitable size and material, but preferably of metal. Each of these clasps is formed with a link-like opening $b$, which is broken, as at $b'$, on its inner or adjacent side in order to admit of the insertion of the prongs $a$ and $a'$ of the fork A'. The rear portion of each of the broken parts of these clamps or clasps is provided with a screw-threaded socket $c$, with which engages a screw C, which is inserted in a suitable opening $c'$, extending from the front of each of the clasps longitudinally through the same. The clasp or clamp B is provided on its lower surface with a transverse slot D, within which fits and operates the locking-bar E, which is secured in said slot by means of the pivot-pin $e$.

In the front portion of the clamp B and near its outer side is located a spring-actuated bolt $e'$, which is provided with a thumb-piece $e^2$ to retract the same. This bolt is slightly beveled, as shown in Fig. 6 of the drawings, and is employed to retain the locking-bar E in a depending position, as shown by dotted lines in Figs. 2 and 4, and for this purpose the locking-bar is provided at a suitable point near its pivoted end with an opening $d$ to receive said bolt. The clasp B' is likewise provided with a transverse slot D for the reception of the free end of the locking-bar E, which locking-bar is provided near its free end with a slot or opening $e^3$ to receive the spring-actuated bolt $f$ of the lock F, which lock is located in the front end of the clamp B' and may be of any suitable construction or kind. The bolt $f$ is beveled, as shown in Fig. 5, so that when the lock-bar E is pressed against the same it will recede until the slot $e^3$ in the lock-bar is brought into alinement therewith when, by reason of its spring (not shown) it will be forced into said slot and thus lock the bar, and may be released therefrom by the insertion of a key in the opening $f'$ therefor in the lock.

From the foregoing and by reference to the drawings it will be seen and readily understood that by removing the screws C from their sockets the broken portions $b'$ of the link-like openings $b$ will be open to allow the said links to be placed around the prongs $a$ and $a'$ of the front fork of the bicycle, after which the screws may be inserted and screwed down to the position illustrated in Fig. 3 of the drawings, when it will be impossible to reach them by means of a screw-driver or other implement while the lock-bar E is in its locked position. It is apparent that when the bicycle is in use the lock-bar E will hang alongside of one of the prongs of the front fork and will be held in said position by reason of the spring-bolt $e'$, which engages the opening $d$ in the lock-bar, as before stated. When it is desired to release the lock-bar from its depending position, the bolt $e'$ may be retracted by pressing the thumb-piece $e^2$ toward the front of the clasp B, which clasp is provided with a slot $e^4$ for the operation of said thumb-piece.

Having thus fully described my invention, what I claim as new, and desire to secure by Letters Patent, is—

1. The combination with the fork of a bicycle, of a broken link-like clasp or clamp secured on each of the prongs thereof, said clamps having openings and screw-threaded sockets and screws in the same to secure the clamps on the prongs, a spring-lock located in one of said clamps and adapted to engage a lock-bar, said lock-bar being pivotally connected to the other clamp and adapted to shield the securing-screws of the clamps when the bar is in a locked position, substantially as described.

2. The combination of a pair of clamps each having an open portion to admit of the prong of a bicycle-fork and provided with an opening and screw-threaded socket and screw in the same to secure the clamp on the prong, a spring-lock located in one of said clamps, a lock-bar pivotally secured to the other clamp and having means to engage the spring-lock and adapted when in such engaged position to guard or shield the securing-screws, substantially as described.

MAX THOMSEN.

Witnesses:
CHAS. C. TILLMAN,
E. A. DUGGAN.